(12) United States Patent
Vanderspurt et al.

(10) Patent No.: US 7,744,824 B2
(45) Date of Patent: Jun. 29, 2010

(54) ON-BOARD FUEL DESULFURIZATION UNIT

(75) Inventors: Thomas H. Vanderspurt, Glastonbury, CT (US); Sarah J. Arsenault, Vernon, CT (US); Theresa A. Hugener-Campbell, Coventry, CT (US); Sean C. Emerson, Broad Brook, CT (US); Zidu Ma, Ellington, CT (US); James D. MacLeod, Vernon, CT (US); Susanne M. Opalka, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1092 days.

(21) Appl. No.: 11/387,430

(22) Filed: Mar. 23, 2006

(65) Prior Publication Data

US 2007/0225155 A1  Sep. 27, 2007

Related U.S. Application Data

(60) Provisional application No. 60/753,860, filed on Dec. 23, 2005.

(51) Int. Cl.
*B01D 50/00* (2006.01)

(52) U.S. Cl. ......................................... 422/178; 502/34

(58) Field of Classification Search .................. 502/34, 502/20, 56, 514, 400; 422/178
See application file for complete search history.

(56) References Cited

U.S. PATENT DOCUMENTS 4,322,394 A * 3/1982 Mezey et al. ........... 423/244.11

6,908,498 B2 6/2005 Ament et al.
2004/0101451 A1 * 5/2004 Ament et al. ............... 422/173

FOREIGN PATENT DOCUMENTS

| CA | 2 008 242 | 7/1991 |
|---|---|---|
| DE | 197 03 068 A1 | 1/1997 |
| DE | 197 27 376 A1 | 6/1997 |
| DE | 103 43 810 A1 | 6/2004 |
| EP | 0 019 879 B1 | 12/1980 |
| JP | 11-244711 | 9/1999 |
| JP | 2004-176713 | 6/2004 |
| WO | WO 94-26661 | 11/1994 |
| WO | WO 03/080237 A1 | 10/2003 |

OTHER PUBLICATIONS

Zhaoyi Xu et al., Applications of Porous Resin Sorbents in Industrial Wastewater Treatment and Resource Recovery, Critical Reviews in Environmental Science and Technology, 33:363-389, 2003.
J. D. Bathen, et al., Chemie Ingenieur Technik, 1999 (71) 89-93.
J. Reuβ et al., Chemie Ingenieur Technik, Desorption durch Mikrowellen: Mechanismen bei Mehrkompeonen-Tengemischen, (73) 360-363, 2001.
Richrath, et al., Chemie Ingenieur Technik, Desorption durch Mikrwellen unter Vakuum, (75) 86-90, 2003.

* cited by examiner

*Primary Examiner*—Edward M Johnson
(74) *Attorney, Agent, or Firm*—Kinney & Lange, P.A.

(57) ABSTRACT

The athermal sorbent bed regeneration system of the present invention includes a main fuel supply, at least one sorbent bed, a source of microwave energy, and a secondary fuel supply. The main fuel supply has a first concentration of an impurity and the secondary fuel supply has a second concentration of the impurity that is less than the first concentration of the impurity. The sorbent bed adsorbs the impurity. The microwave energy source regenerates the sorbent bed for reuse.

17 Claims, 8 Drawing Sheets

ON-BOARD FUEL DESULFURIZATION UNIT

BACKGROUND OF THE INVENTION

The present invention relates generally to the field of purification systems. In particular, the invention relates to athermal desulfurization systems.

Most hydrocarbon or biomass derived fuels contain sulfur in excess of the level tolerable by fuel cell systems without loss in performance. This is particularly true of on-board fuel cell systems used as auxiliary power units. Most fuel cells typically give the best performance using pure hydrogen. Even a small percentage of sulfur (in the parts per million range) in the fuel gas can severely degrade the performance of the fuel cell. Solid oxide fuel cells, however, do not require pure hydrogen to operate. Solid oxide fuel cells are capable of operating on hydrocarbon fuels that produce carbon monoxide, which acts as a fuel to the electrodes in the fuel cells. While solid oxide fuel cells can run on fuel that contains hydrocarbons, the fuel must still be generally free of other contaminants, such as sulfur.

There are numerous mechanisms known in the art for removing sulfur from fuel. It is well known that certain high surface area solids can adsorb or chemisorb sulfur-containing molecules typically found in fuel including mercaptans, sulfides, thiophenes, thiophanes, and the like. Thus, one method currently being used to remove sulfur from fuel is to pass the sulfur-containing fuel through a sorbent bed. The sorbent bed adsorbs the sulfur from the fuel, resulting in a fuel that is either sulfur-free, or containing only a nominal amount of sulfur. However, sorbent beds can only adsorb a specified amount of sulfur before reaching a breakthrough point, at which time the sulfur begins to pass through the sorbent bed, making the sorbent bed less effective. Once the sorbent bed reaches the breakthrough point, it must be regenerated prior to reuse.

One of the methods currently being used to regenerate sorbent beds is to apply thermal energy to the sorbent bed in the presence of a flowing fluid in order to excite, desorb, and remove the sulfur-containing molecules from the sorbent bed. The sorbent bed is first heated to desorb the sulfur from the sorbent. After the sorbent bed has cooled down, it can be used to adsorb additional sulfur compounds. Thus, a heat exchanger is typically needed to regenerate the sorbent bed. Due to the need for high thermal energy and a bulky heat exchanger to regenerate the sorbent bed, it is often impractical to have a sorbent bed regeneration system on-board a moving vehicle, such as a jetliner or a truck. Additionally, the use of high thermal energy can often reduce the overall efficiency of the sorbent bed or significantly limit the life of the sorbent.

BRIEF SUMMARY OF THE INVENTION

The athermal sorbent bed regeneration system of the present invention includes a main fuel supply, at least one sorbent bed, a source of microwave energy, and a secondary fuel supply. The main fuel supply has a first concentration of an impurity and the secondary fuel supply has a second concentration of the impurity that is less than the first concentration of the impurity. The sorbent bed adsorbs the impurity. The microwave energy source regenerates the sorbent bed for reuse.

DETAILED DESCRIPTION

Figure 1:
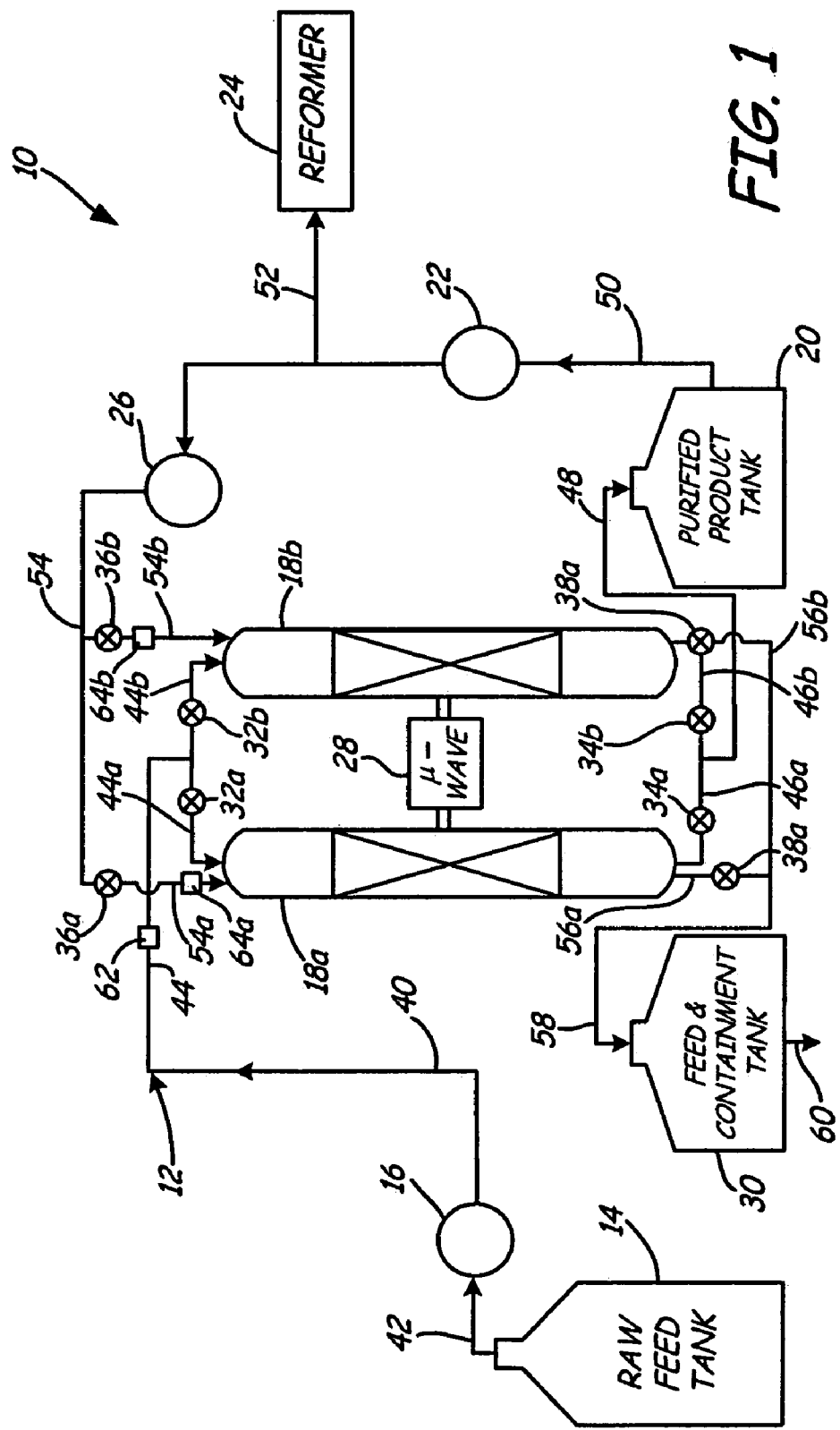
FIG. 1 is a schematic diagram of a first embodiment of a sorbent bed regeneration system.

FIG. 1 shows a schematic diagram of athermal, on-board sorbent bed regeneration system 10 that removes impurities, such as sulfur, from a fluid using a sorbent bed and then regenerates the sorbent bed. Regeneration system 10 is a multibed system with recycle and generally includes circulation system 12, raw feed tank 14, desulfurizer feed pump 16, first sulfur sorbent bed 18a and second sulfur sorbent bed 18b, purified product tank 20, purified product pump 22, reformer 24, desulfurizer recycle pump 26, microwave energy source 28, and effluent tank 30. Regeneration system 10 also includes a plurality of valves: first raw feed valve 32a, second raw feed valve 32b, first output valve 34a, second output valve 34b, first reverse flow valve 36a, second reverse flow valve 36b, first effluent valve 38a, and second effluent valve 38b. All of the valves are switchable between an open position and a closed position. In the open position, the valve allows fluid to flow through the valve. In the closed position, the valve prevents fluid from flowing through the valve. Regeneration system 10 is designed using actuated valves to connect multiple sorbent beds head to tail to form a circle where each bed is also connected to the feed line, the product line, and the concentrate line.

Due to its ability to athermally regenerate first and second sulfur sorbent beds 16a and 16b, regeneration system 10 is capable of being on-board a moving vehicle. An athermal regeneration system refers to the ability of the rapidly oscillating electric field inherent in microwave electromagnetic radiation to transmit energy to polar, or polarizable, molecules sufficient to disrupt the adsorptive forces between that species and the sorbent in the sorbent bed. Typically, harmful impurities, such as sulfur compounds found in fuel, are polar enough to be excited by the oscillating electric field vector of the microwave radiation when adsorbed onto the sorbent. Because microwave energy, rather than thermal energy, is used to regenerate sulfur sorbent beds 16a and 16b, regeneration system 10 can be used for mobile use without posing significant risks. Regeneration system 10 is thus capable of producing a hydrogen-rich reformate stream for use in a fuel cell by removing sulfur from fuel. Although FIG. 1 is discussed in the context of using regeneration system 10 to remove sulfur from raw fuel to produce fuel of sufficient purity for use in a fuel cell, regeneration system 10 may be used in any process where it is desired to remove impurities from a fluid, including, but not limited to: desulfurizing liquid fuels such as logistic fuels and gasoline; desulfurizing gaseous fuels such as natural gas (i.e. digester gas, landfill gas, sewage treatment gas, etc.); removing ammonia, amines, and the like from hydrogen in a hydrogen storage system; removing impurities from fuel used in vehicles such as aircraft, submarines, ships, spacecraft, military vehicles, and the like; purifying air in structures such as buildings, tents, safe-havens, and the like; purifying air in vehicles such as aircraft, submarines, ship compartments, spacecraft, military vehicles, and the like; and purifying enclosed areas such as shipping container atmospheres.

Circulation system 12 circulates fuel through regeneration system 10. Piping 40 of circulation system 12 generally includes raw feed line 42, first intermediate line 44, first feed line 44a, second feed line 44b, first output line 46a, second output line 46b, pure feed line 48, second intermediate line 50, hydrogen line 52, third intermediate line 54, first reverse feed line 54a, second reverse feed line 54b, first effluent line 56a, second effluent line 56b, contaminated line 58, and discharge line 60.

Raw feed tank 14 contains sulfur-containing fuel and can contain approximately 3,000 parts per million (ppm) sulfur. While vehicles can operate on sulfur-rich fuel, fuel cells require a more hydrogen-pure fuel. Thus, in order to produce hydrogen-pure fuel, the fuel in raw feed tank 14 is pumped by desulfurizer feed pump 16 from raw feed tank 14 though raw feed line 42 to first and second raw feed valves 32a and 32b. When first raw feed valve 32a is in the open position, fuel from raw feed tank 14 is allowed to flow through first raw feed line 44a and enter first sorbent bed 18a for desulfurization. Likewise, when second raw feed valve 32b is in the open position, fuel from raw feed tank 14 is allowed to flow through second raw feed line 44b and enter second sorbent bed 18b for desulfurization. When either of raw feed valves 32a and 32b is closed, fuel cannot enter the respective sorbent bed. Typically, only one of raw feed valves 32a and 32b is open at a time.

First and second sorbent beds 18a and 18b are used in alternation, with one sorbent bed being used to desulfurize the fuel while the other sorbent bed is simultaneously being regenerated. For ease of discussion, first sorbent bed 18a will be discussed when it is being used to adsorb sulfur-containing molecules from the fuel and second sorbent bed 18b will be discussed when it has reached its breakthrough point and is being regenerated. However, it should be noted that the same discussion would hold true when first sorbent bed 18a is being regenerated and second sorbent bed 18b is being used to desulfurize the fuel by simply reversing the direction of each of the valves.

First sulfur sorbent bed 18a is a layered bed having specially engineered microwave waveguides and containing sorbents for adsorbing sulfur-containing molecules from the fuel supplied from raw feed tank 14. In one embodiment, first sorbent bed 18a uses a first sorbent and a second sorbent to adsorb sulfur from the sulfur-rich fuel flowing through first sorbent bed 18a. The first sorbent functions as a presorbent while the second sorbent actually adsorbs the sulfur. The first sorbent acts to protect the second sorbent from dissolved wax, polar nitrogen compounds, and other species that might consume the capability of the second sorbent to remove sulfur from the fuel. The second sorbent is a nanocrystalline, high surface area, large pore, tailor-mixed metal oxide support loaded with a very high dispersion metal, mixed metal clusters, metal compounds, and the like, similar to those described in U.S. Patent Application No. 2003/235,526. It is critical that the second sorbent forms a bond to the sulfur that is strong enough to remove it from the fuel, but weak enough to sufficiently excite the sulfur by the application of a microwave field to desorb from the second sorbent. The microwave field emits electro-magnetic energy sufficient to disrupt the adsorptive forces between the sulfur and the sorbents. The sorbents are chosen to optimize microwave permitivity and minimize direct microwave heating of the sorbent structure and are capable of reducing the amount of sulfur in the fuel so that the desulfurized fuel leaving first sorbent bed 18a typically contains less than approximately 15 ppm sulfur. In one embodiment, the first sorbent can include Selexsorb CDX, available from Almatis AC Incorporated, Houston, Tex.

In a second embodiment, first sorbent bed 18a uses an additional sorbent between the first and second sorbent layers of the first embodiments. Thus, a first, second, and third sorbent are used to adsorb sulfur from the sulfur-rich fuel flowing through first sorbent bed 18a. The first sorbent functions as a presorbent while the second and third sorbents actually adsorb the sulfur. Similar to the first embodiment, the first sorbent acts to protect the second sorbent from dissolved wax, polar nitrogen compounds, water, and other species that might consume the capability of the second sorbent to remove sulfur from the fuel. The second sorbent is designed to adsorb bulky sulfur compounds while the third sorbent is designed as a high capacity selective sulfur sorbent.

First sorbent bed 18a continues to adsorb the sulfur-containing molecules from the fuel supplied by raw feed tank 14 until first sorbent bed 18a approaches its breakthrough point. The breakthrough point is the point at which the sorbent bed reaches saturation and cannot adsorb any more sulfur without the adsorbed sulfur breaking through the sorbent bed. The breakthrough point of first sorbent bed 18a can be monitored by any method known in the art, including, but not limited to: time, flow, fuel sulfur level, or any combination thereof. When first sorbent bed 18a approaches its breakthrough point, flow through first sorbent bed 18a is stopped. In one embodiment, first sorbent bed 18a may also be temperature controlled.

Second sulfur sorbent bed 18b functions in the same manner as first sorbent bed 18a and works in tandem with first sorbent bed 18a. When first sorbent bed 18a reaches its breakthrough point and needs to be regenerated, the sulfur-rich fuel is redirected through second sorbent bed 18b for desulfurization while the sulfur-containing molecules in first sorbent bed 18a are being desorbed and first sorbent bed 18a is being regenerated. Likewise, when second sorbent bed 18b reaches its breakthrough point and needs to be regenerated, the sulfur-rich fuel is redirected through first sorbent bed 18a for desulfurization while the sulfur-containing molecules in second sorbent bed 18b are being desorbed and second sorbent bed 18b is being regenerated.

Once the sulfur has been removed from the fuel in first sorbent bed 18a, the desulfurized fuel leaves first sorbent bed 18a through first output line 46a to first output valve 34a. When fuel is being passed through first sorbent bed 18a for desulfurization, first output valve 34a is in the open position and allows the purified fuel to flow through pure fuel line 48 to be collected in purified product tank 20. The desulfurized fuel is then pumped from purified product tank 20 through second intermediate line 50 by purified product pump 22. A first portion of the desulfurized fuel is pumped through hydrogen line 52 to reformer 24 for use. A second portion of the desulfurized fuel continues to be pumped through second intermediate line 50 by desulfurizer recycle pump 26 to third intermediate line 54.

The first portion of the desulfurized fuel is transported to a fuel cell where it is used to produce electricity. Alternatively, the first portion of the desulfurized fuel can be transported to a fuel processor prior to entering the fuel cell. An example of a fuel processor is reformer 24. Reformer 24 can be, for example, a catalytic partial oxidation reformer (CPO). CPO reformers are compact, fuel flexible type reformers having very fast reaction kinetics and correspondingly high space velocities. While these advantages are at the expense of efficiency, the efficiency losses are moderate when used with a solid oxide fuel cell (SOFC) system due to the ability of SOFCs to consume both carbon monoxide and hydrogen. CPO reformers typically begin to function at approximately 300 degrees Celsius (° C.) but actually operate at temperatures greater than approximately 700° C., for example, between approximately 800° C. and approximately 1200° C. The typical start-up time of a CPO reformer is less than approximately forty minutes. In the absence of preheated air, as in the present invention, a fuel-air mixture could be briefly adjusted, in combination with a variety of ignition approaches, to combust the fuel and produce local heating for the CPO reformer until it reaches a temperature of approximately 300 degrees ° C., at which point the CPO reformer can operate without additional combustion.

The second portion of the desulfurized fuel is sent through third intermediate line 54 to first and second reverse flow valves 36a and 36b. As mentioned above, for ease of discussion, it is stipulated that fuel is being passed through first sorbent bed 18a for desulfurization, while fuel is being passed through second sorbent bed 18b to regenerate second sorbent bed 18b. Thus, first reverse flow valve 36a is in the closed position, preventing fuel from entering first sorbent bed, and second reverse flow valve 36b is in the open position, allowing fuel to enter second sorbent bed 18b.

When fuel is being passed through second sorbent bed 18b to regenerate second sorbent bed 18b, the fuel is passed through in a co-flow or counterflow direction to desorb the sulfur-containing molecules adsorbed on the surface of the sorbent in second sorbent bed 18b. The dimensions of first and second sorbent beds 18a and 18b are determined by the principles of microwave engineering based on the microwave properties of the fuel-filled sorbent at the microwave frequency employed, the properties of the sorbent bed walls, whether the sorbent bed is grounded or electrically isolated, and other factors. To reduce potential damage to second sorbent bed 18b, the direct exposure of the sorbents in second sorbent bed 18b to microwave heating is minimized by applying the microwave field from microwave energy source 28 to second sorbent bed 18b such that second sorbent bed 18b is effectively subjected to a traveling microwave electric field while still maximizing the penetration of the oscillating microwave electric field onto the sorbent. When the proper microwave frequency range from microwave energy source 28 is applied to second sorbent bed 18b, the oscillating electric field causes the sulfur-containing molecules to become excited and gain the activation energy necessary to disrupt the adsorptive forces between the impurity, such as the sulfur-containing molecules, and the sorbent. The nature of this excitation provides the activation energy necessary for the polar molecules to desorb from the sorbent. The rate of desorption is calculated by the following equation:

$$\text{Desorption rate} = Ae^{-\Delta G^*/RT}$$

Where A is a constant that contains the number of sites; $\Delta G^*$ is the free energy of activation of the desorption reaction; R is the gas constant; and T is the temperature in ° K.

Because the impurity adsorbed on the sorbent interacts more strongly with the microwave energy than the sorbent or the fuel, the athermal microwave effect causes the sulfur-containing molecules to be desorbed into the desulfurized fuel passing through second sorbent bed 18b. The sulfur-containing molecules can thus be flushed away from the sorbent by the desulfurized fuel flowing through second sorbent bed 18b. Regeneration system 10 thus uses microwave energy, rather than thermal energy to regenerate first and second sorbent beds 18a and 18b. After the sulfur-containing molecules have been desorbed into the fuel, the now sulfur-enriched fuel is sent to second effluent valve 38b. When second effluent valve 38b is in the open position, the sulfur-enriched fuel is allowed to pass through contaminated line 58 to effluent tank 30. The fuel in effluent tank 30 can then be sent through discharge line 60 to a source that can operate on sulfur-rich fuel, such as a vehicle.

Although FIG. 1 depicts using eight valves to control the flow of fuel through circulation system 12, any number of valves can be used without departing from the intended scope of the invention. For example, a first three-way valve can be used in place of first and second raw feed valves 32a and 32b, a second three-way valve can be used in place of first and second output valves 34a and 34b, a third three-way valve can be used in place of first and second reverse flow valves 36a and 36b, and a fourth three-way valve can be used in place of first and second effluent valves 38a and 38b. Alternatively, any combination of valves can be used in regeneration system 10 as long as the flow of fuel can be controlled through circulation system 12. Additionally, although FIG. 1 depicts using two sulfur sorbent beds in alteration, only one sorbent bed may be used in regeneration system 10. If only one sorbent bed is used, the flow of sulfur-containing fuel through the sorbent bed is stopped when the sorbent bed reaches breakthrough, and a flow of desulfurized fuel is sent through the sorbent bed in either a co-flow or counterflow direction while microwave energy is being applied to the sorbent.

Optionally, regeneration system 10 can also include raw feed sensor 62, first sorbent bed sensor 64, and second sorbent bed sensor 64b. Raw feed sensor 62 is positioned at first intermediate line 44 and detects the flow rate of the fuel from raw feed tank 14. Raw feed sensor 62 can also be designed to detect the concentration of one or more contaminants or constituents of the fuel. First sorbent bed sensor 64a is positioned at first reverse flow line 54a. Second sorbent bed sensor 64b is positioned at second reverse flow line 54b. First and second sorbent bed sensors 64a and 64b sense the flow rate and direction of the output leaving first and second sorbent beds 18a and 18b, respectively. Optionally, first and second sorbent bed sensors 64a and 64b can also be designed to detect one or more contaminants or constituents in the output. Regeneration system 10 can be designed such that first sorbent bed sensor 64a must sense a flow in a desired direction into first sorbent bed 18a in order to activate microwave energy source 28 and similarly, that second sorbent bed sensor 64b must sense a flow in a desired direction into second sorbent bed 18b in order to activate microwave energy source 28.

Figure 2A:
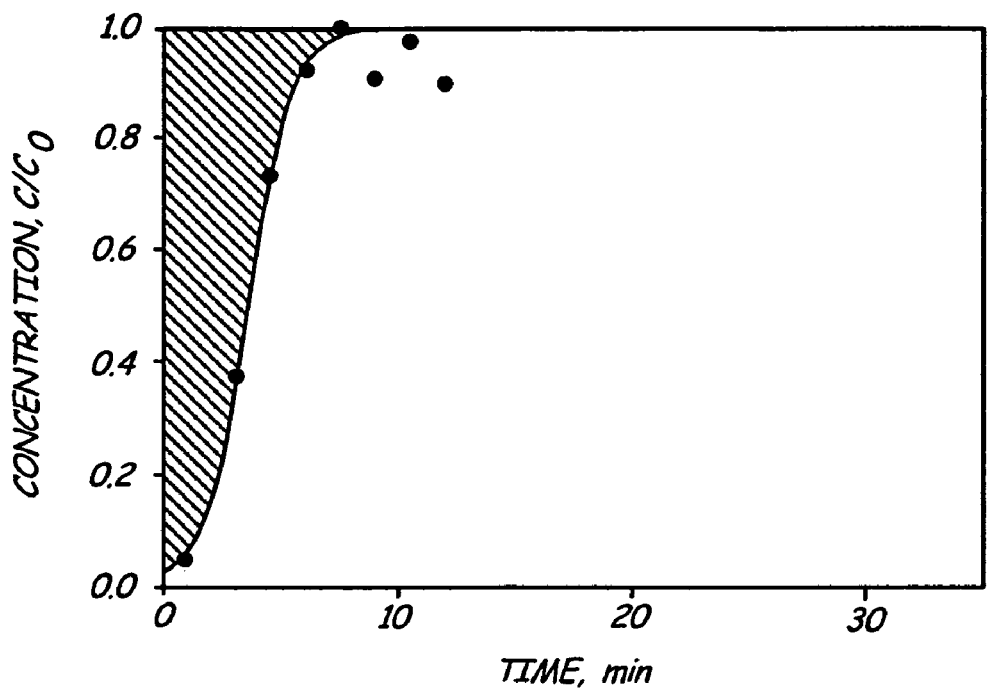
FIG. 2A is a graph of the capacity of a sorbent bed of the first embodiment of the regeneration system at an initial breakthrough point.
Figure 2B:
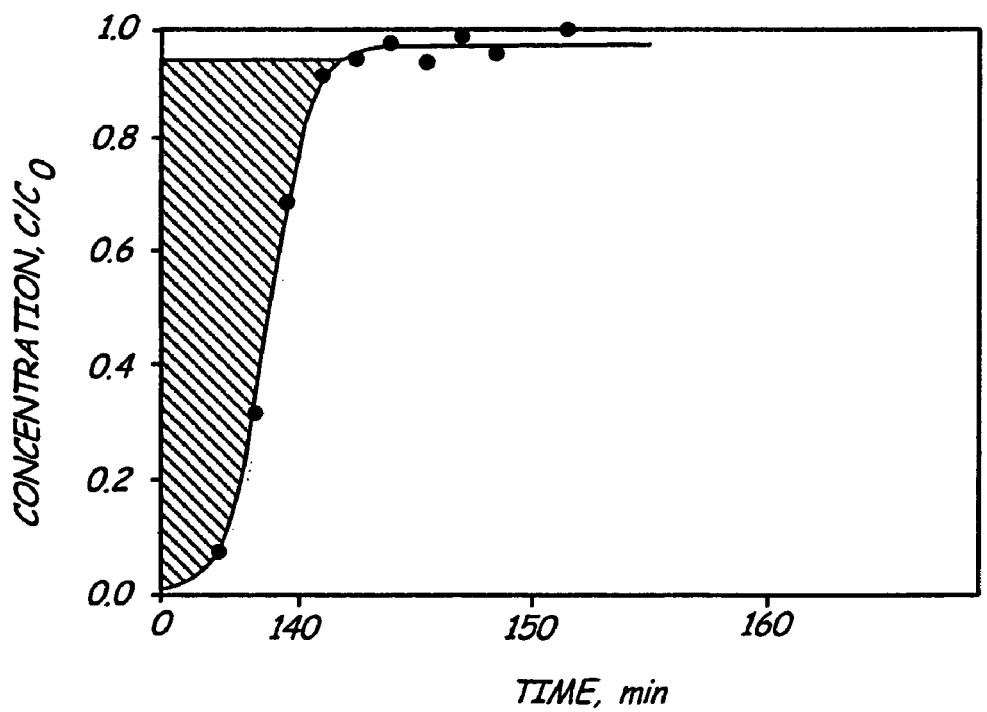
FIG. 2B is a graph of the capacity of the sorbent bed of the first embodiment of the regeneration system at a breakthrough point after the sorbent bed has been regenerated.

To better illustrate the capability of using microwave energy to regenerate the sorbent beds, FIGS. 2A and 2B show graphs representing the capacity of the sorbents to adsorb sulfur-containing molecules from fuel at the point of initial breakthrough A and at a subsequent breakthrough point after microwave energy regeneration B, respectively. In operation, the capacity of the sorbents to adsorb sulfur-containing compounds from the fuel is based on the weight saturation of the sorbents ($W_{sat}$), which is determined by the following equation:

$$W_{sat} = [(\text{Sulfur flow rate} \times \text{weight of sulfur adsorbed by bed})/\text{cross-sectional area of bed}]/(\text{bed length} \times \text{density of sorbent in bed})$$

As can be seen in FIGS. 2A and 2B, the sorbents were able to remove sulfur from the fuel at approximately the same capacity at the initial breakthrough point A as at subsequent breakthrough point B. At the point of initial breakthough A, $W_{sat}$ was approximately $9.9 \times 10^{-4}$ grams of sulfur per gram of sorbent (gS/g sorbent). At the point of breakthrough after the sorbent bed was regenerated using microwave energy B, occurring after approximately 140 minutes, $W_{sat}$ was approximately $1.8 \times 10^{-3}$ gS/g sorbent.

Figure 3A:
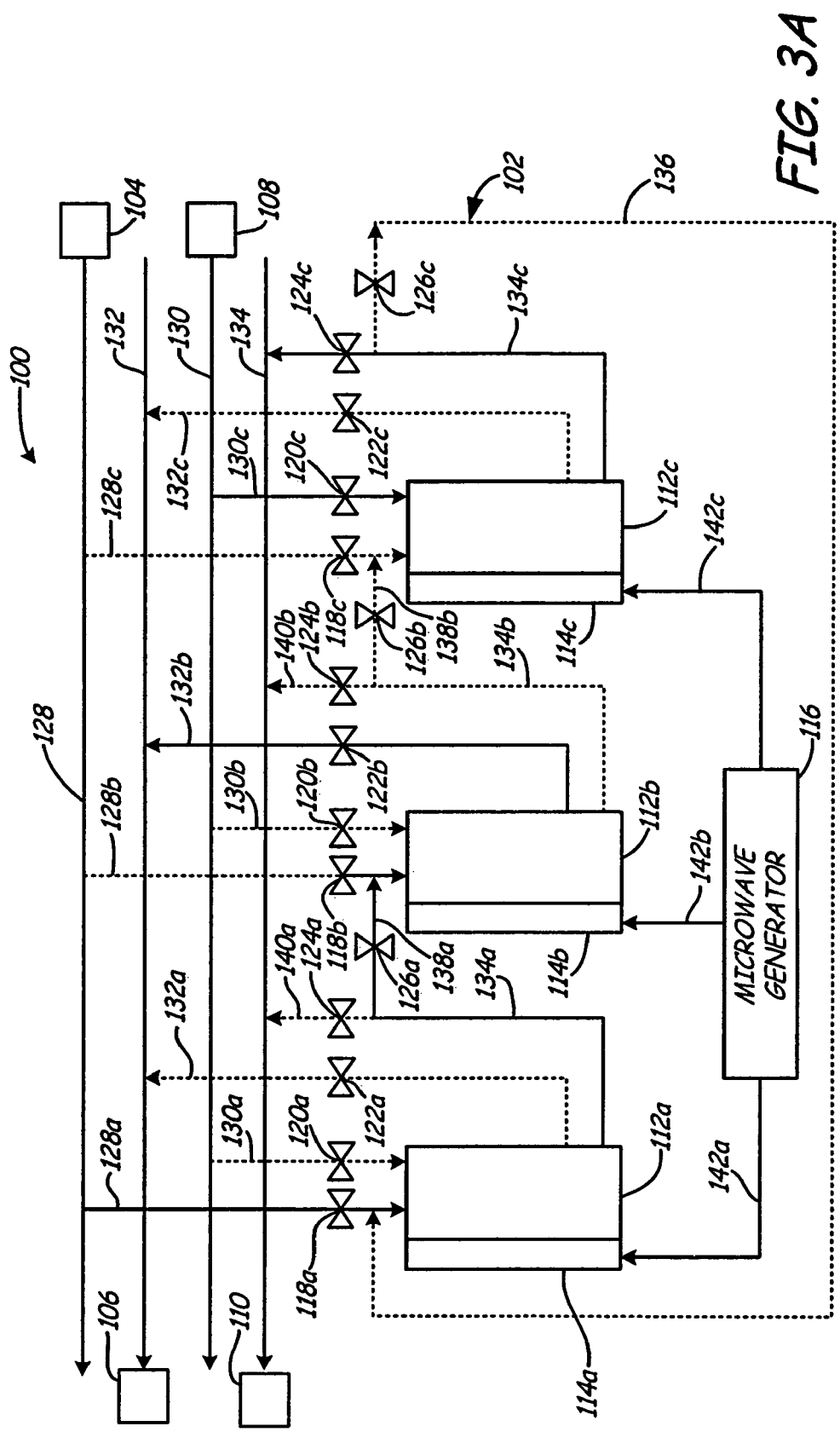
FIG. 3A is a schematic diagram of a second embodiment of a regeneration system having multiple sorbent beds at an initial time.
Figure 3B:
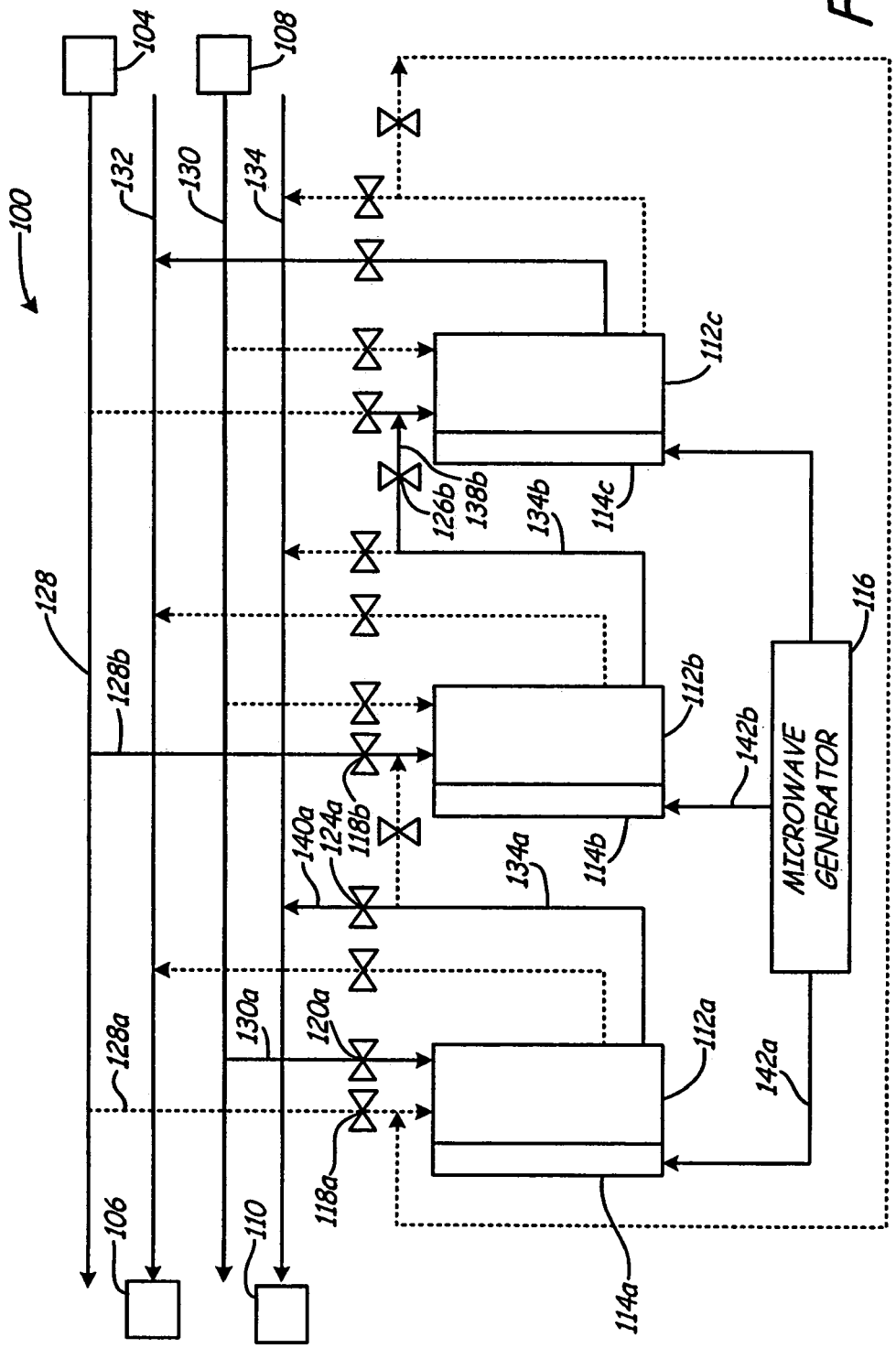
FIG. 3B is a schematic diagram of the second embodiment of the regeneration system when a first sorbent bed has reached its breakthrough point.
Figure 3C:
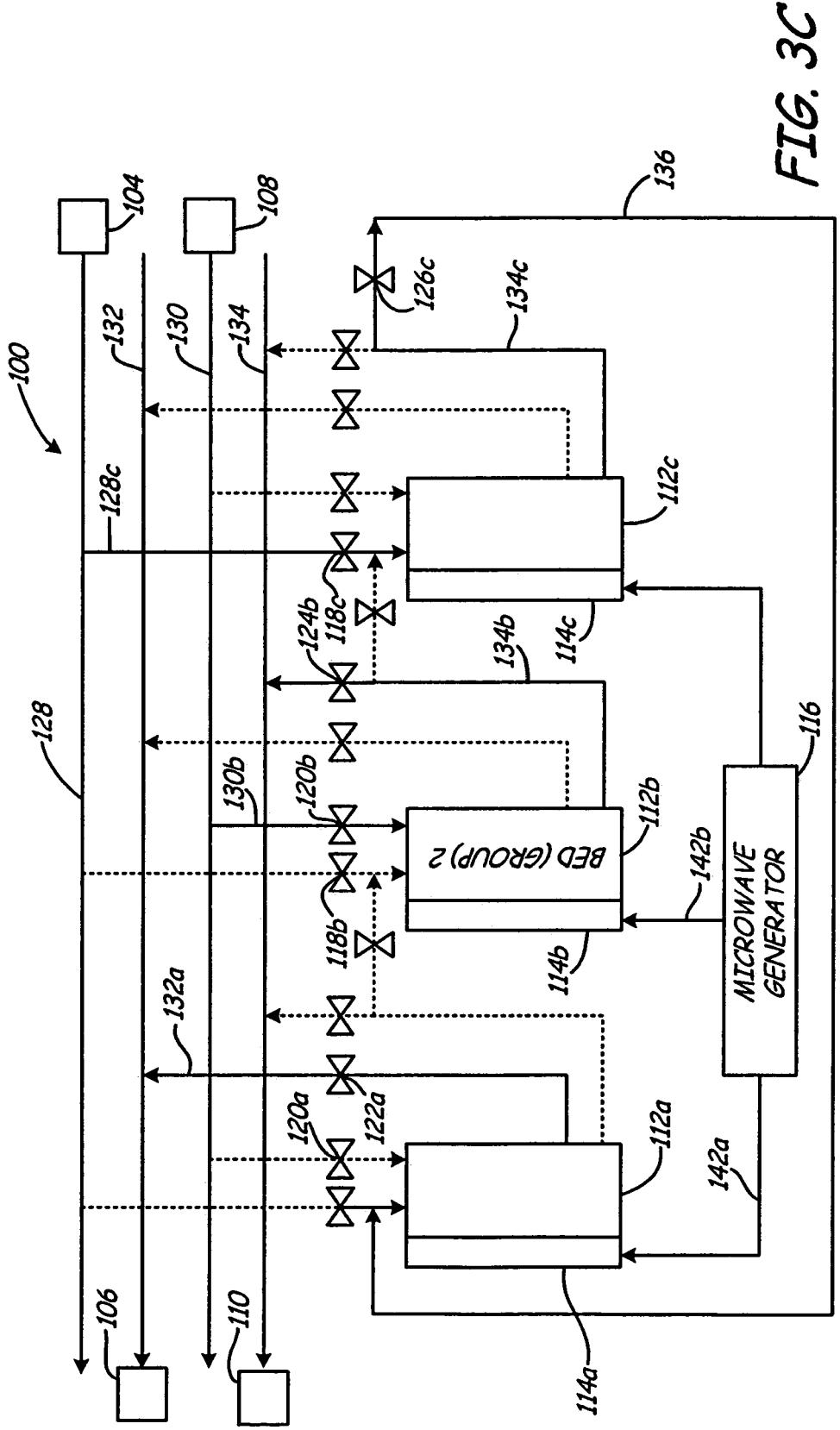
FIG. 3C is a schematic diagram of the second embodiment of the regeneration system when a second sorbent bed has reached its breakthrough point.

FIGS. 3A, 3B, and 3C show a schematic diagram of a second embodiment of simulated moving bed regeneration system 100 having multiple sorbent beds. Regeneration system 100 takes into account the limitation of microwave irradiation penetration depth of packed sorbent beds and generally includes circulation system 102, raw feed supply 104, clean product supply 106, regeneration fuel supply 108, concentrate by-product supply 110, first sorbent bed 112a having first microwave generator 114a, second sorbent bed 112b having second microwave generator 114b, third sorbent bed 112c having third microwave generator 114c, and microwave source 116. Regeneration system 100 also includes a plurality of valves connected to first, second, and third sorbent beds 112a-112c, respectively: raw feed valves 118a, 118b, and 118c; reverse flow valves 120a, 120b, and 120c; purified product valves 122a, 122b, and 122c; effluent valves 124a, 124b, 124c; and intermediate valves 126a, 126b, and 126c. Regeneration system 100 interacts and functions in the same manner as regeneration system 10. Similar to regeneration system 10, all of the valves are switchable between an open position and a closed position. In the open position, the valve allows fluid to flow through the valve. In the closed position, the valve prevents fluid from flowing through the valve.

Circulation system 102 circulates fuel through regeneration system 100 and generally includes raw feed line 128, first feed lines 128a, 128b, and 128c, regeneration feed line 130, second feed lines 130a, 130b, and 130c, purified product line 132, product output lines 132a, 132b, and 132c, concentrate by-product line 134, concentrate output lines 134a, 134b, and 134c, recycle line 136, first intermediate line 138a, second intermediate line 138b, concentrate output lines 140a, 140b, and 140c, and energy lines 142a, 142b, and 142c. In FIGS. 3A-3C, solid feed lines indicate that the connecting valve is in the open position, allowing fluid flow, and dotted feed lines indicate that the connecting valve is in the closed position, preventing fluid flow.

FIG. 3A shows regeneration system 100 at initial time $T_{initial}$. In operation, first sorbent bed 112a is initially adsorbing the sulfur from the fuel, second sorbent bed 112b is polishing, and third sorbent bed 112c is regenerating. In order for first sorbent bed 112a to absorb sulfur from raw feed supply 128, raw feed valve 118a of first sorbent bed 112a is in the open position, allowing raw feed to enter first sorbent bed 112a through first feed line 128a. Raw feed valves 118b and 118c of second and third sorbent beds 112b and 112c are in the closed position. After the sulfur is adsorbed from the fuel in first sorbent bed 112a, the purified fuel leaves first sorbent bed 112a through concentrate output line 134a and passes through first intermediate valve 126a to first intermediate line 138a, which leads into second sorbent bed 112b. Because second sorbent bed 112b is polishing, the fluid flows through second sorbent bed with higher purity, and leaves through product output line 132b. Purified product valve 122b is open and allows the purified fuel to flow to purified product line 132.

At $T_{initial}$, third sorbent bed 112c is saturated and must be regenerated. Microwave generator 114c of third sorbent bed 112c receives microwave energy from microwave source 116 through third energy line 142c. Simultaneously, regeneration fuel is sent through product output line 132c and reverse flow valve 120c, which is in the open position. The regeneration fuel is sent through third sorbent bed 112c to regenerate the sorbents in third sorbent bed 112c. The concentrate then leaves from third sorbent bed 112c through concentrate output line 134c and passes through effluent valve 124c to concentrate by-product line 134. Intermediate valve 126c is in the closed position. Microwave generators 114a-114c can either be powered on continuously or pulsing.

FIG. 3B shows regeneration system 100 when first sorbent bed 112a is near saturation and needs regenerating and second sorbent bed 112b has reached its breakthrough point. When first sorbent bed 112a is fully saturated, $T_{initial}+T_{cycle}$, first feed valve 118a is switched to the closed position and second feed valve 118b is switched to the open position so that fuel is allowed to flow from raw feed line 128 through second feed line 128b to second sorbent bed 112b but is no longer allowed to flow into first sorbent bed 112a. The fuel thus flows through second sorbent bed 112b, where sulfur continues being absorbed into the sorbent to purify the fuel. The partially purified fuel then leaves second sorbent bed 112b through concentrate output line 134b, passes through second intermediate valve 126b, and flows through second intermediate line 138b into third sorbent bed 112c, which is fully regenerated and in polishing mode. The purified fuel thus flows through third sorbent bed 112c polished to get the desired purity and leaves at product output line 132c, passes through purified product valve 122c, and into purified product line 132.

To regenerate first sorbent bed 112a, microwave energy is sent from microwave source 116 through energy line 142a to first microwave generator 114a connected to first sorbent bed 112a. At the same time, regeneration fuel from regeneration feed line 130 is sent through second feed line 130a and reverse flow valve 120a, which is in the open position. The regeneration fuel is used in combination with the microwave energy from microwave generator 114a to desorb the sulfur from first sorbent bed 112a. The partially purified fuel then leaves first sorbent bed 112a through concentrate output line 134a. Effluent valve 124a is in the open position and allows the effluent to flow through first output line 140a to concentrate by-product line 134.

FIG. 3C shows regeneration system 100 when second sorbent bed 112b is near saturation and needs regenerating and third sorbent bed 112c has reached its breakthrough point. When second sorbent bed 112b is saturated, $T_{initial}+2T_{cycle}$, second feed valve 118b is switched to the closed position and third feed valve 118c is switched to the open position so that fuel is allowed to flow from raw feed line 128 through first feed line 128c to third sorbent bed 112c but is no longer allowed to flow into second sorbent bed 112b. The fuel thus flows through third sorbent bed 112c, where sulfur continues being absorbed into the sorbent to purify the fuel. The partially purified fuel then leaves third sorbent bed 112c through concentrate output line 134c and third intermediate valve 126c into recycle line 136 to first sorbent bed 112a, which is in polishing mode. The partially purified fuel thus flows through first sorbent bed 112a polished to the desired purity and leaves at product output line 132a, passes through purified product valve 122a, and into purified product line 132.

To regenerate second sorbent bed 112b, microwave energy is sent from microwave source 116 through energy line 142b to second microwave generator 114b connected to second sorbent bed 112b. At the same time, regeneration fuel from regeneration fuel line 130 is sent through second feed line 130b and reverse flow valve 120b, which is in the open position. The regeneration fuel is used in combination with the microwave energy from microwave generator 114b to desorb the sulfur from second sorbent bed 112b. The effluent then leaves second sorbent bed 112b through concentrate output line 134b. Effluent valve 124b is in the open position and allows the effluent to flow through second output line 140b to concentrate by-product line 134.

Figure 4A:
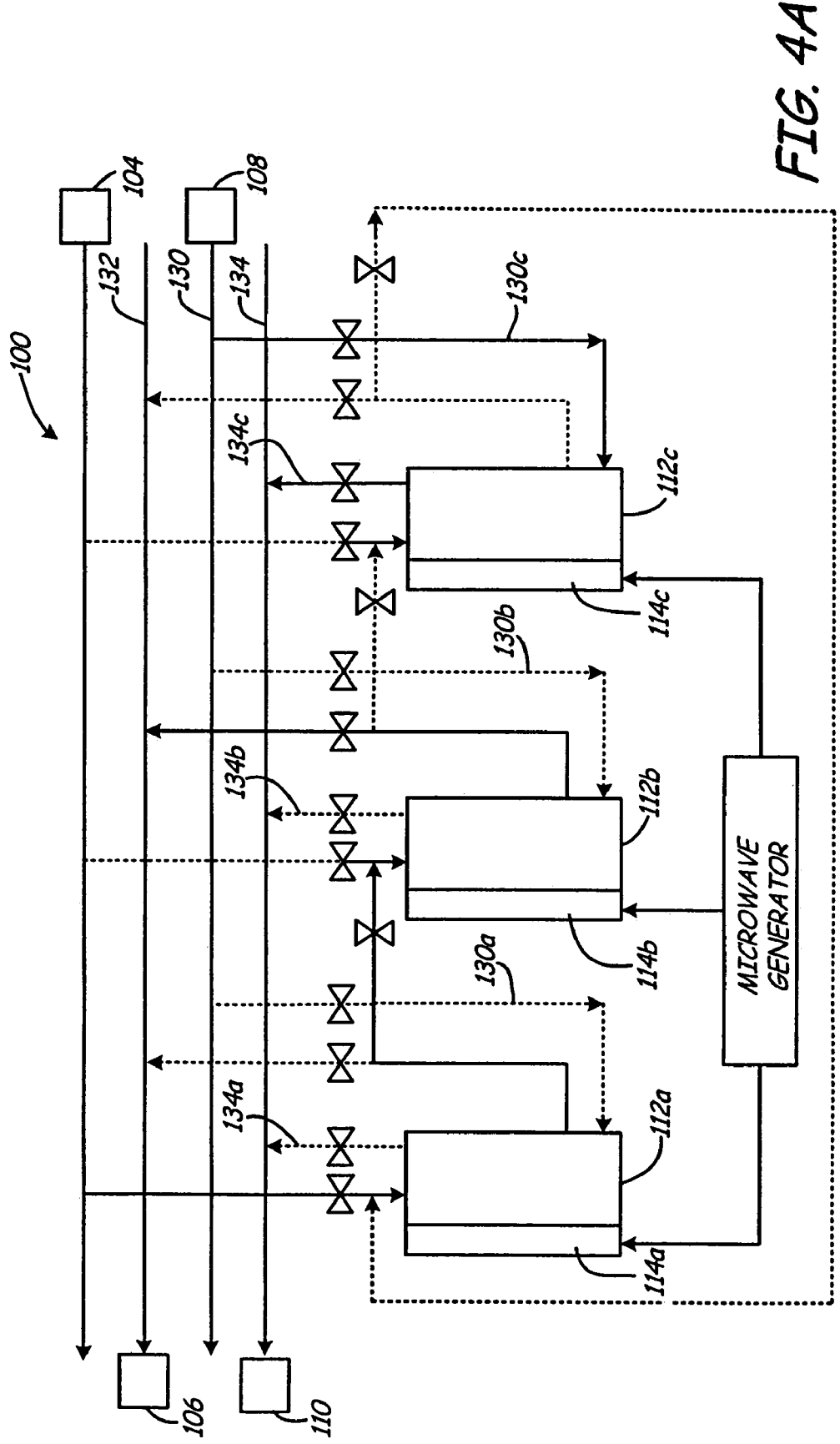
FIG. 4A is a schematic diagram of the second embodiment of the regeneration system using reverse flow regeneration at an initial time.
Figure 4B:
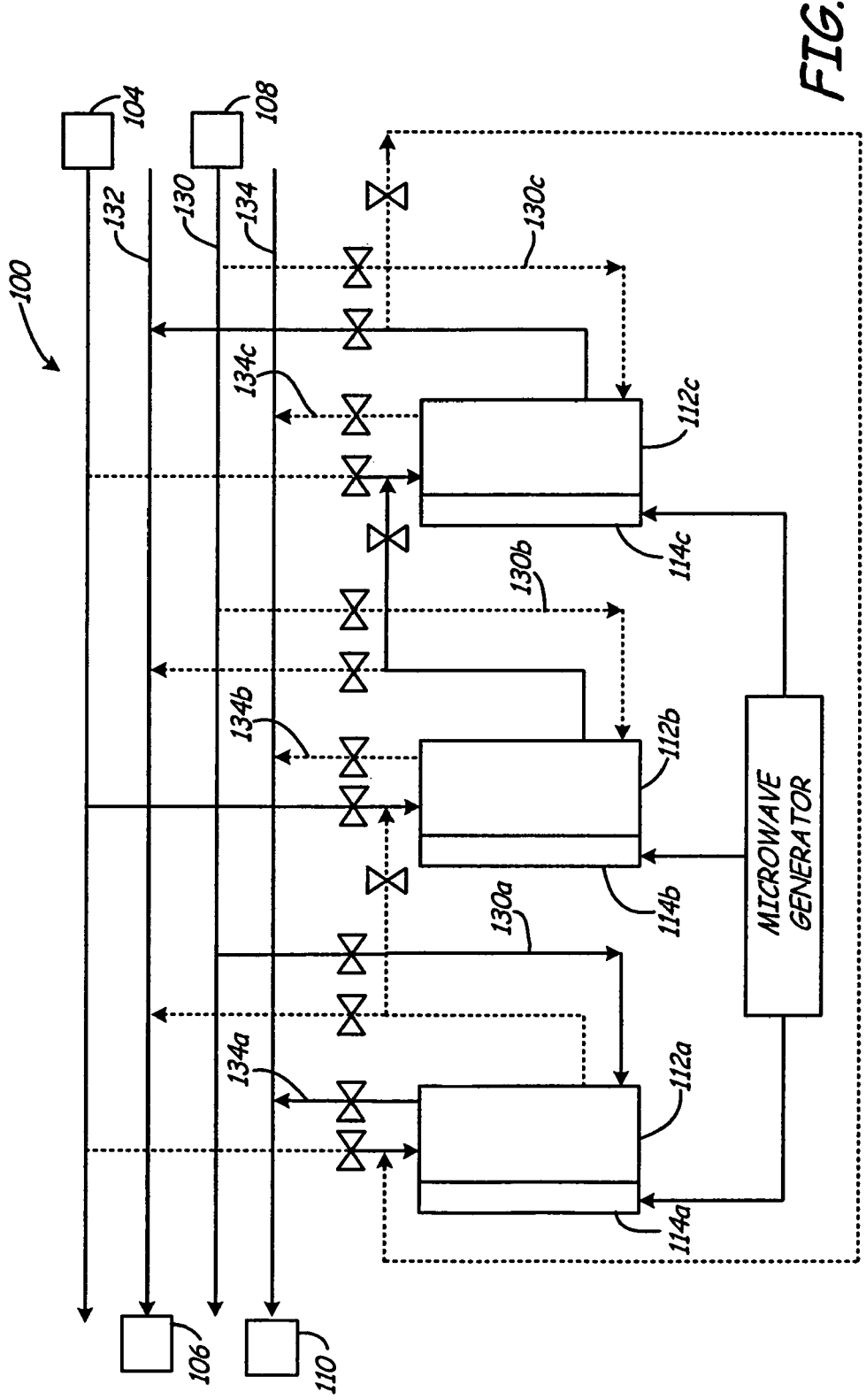
FIG. 4B is a schematic diagram of the second embodiment of the regeneration system using reverse flow regeneration when the first sorbent bed has reached its breakthrough point.
Figure 4C:
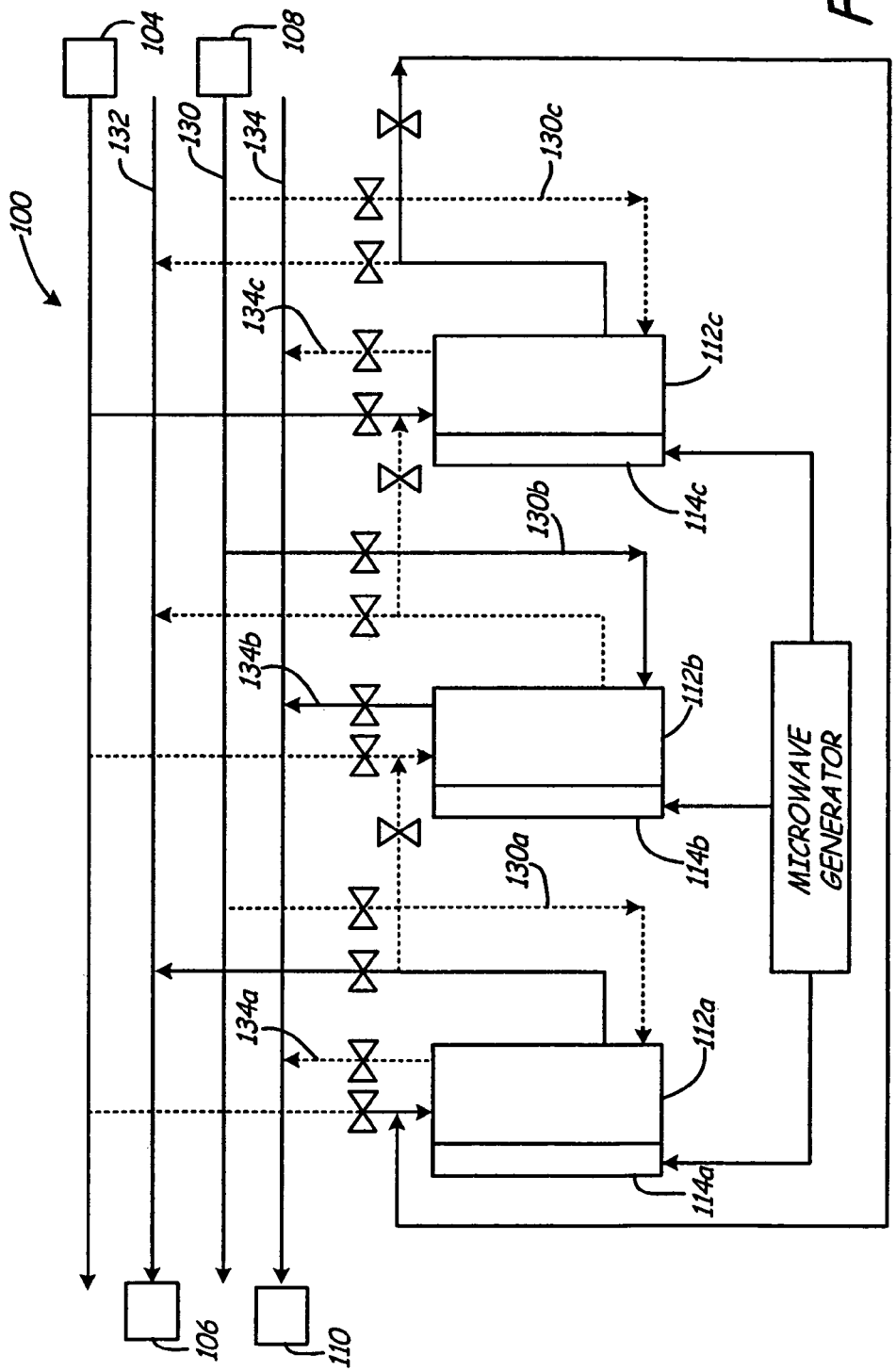
FIG. 4C is a schematic diagram of the second embodiment of the regeneration system using reverse flow regeneration when the second sorbent bed has reached its breakthrough point.

FIGS. 4A-4C show regeneration system 100 at initial time $T_{initial}$, after first sorbent bed 112a is saturated, and after second sorbent bed 112b is saturated, respectively, using reverse flow regeneration. Reverse flow regeneration is typically used if sorbent beds 112a-112c are layered beds. Regeneration system 100 functions the same as when reverse flow regeneration is not used, except that regeneration fuel is fed to sorbent beds 112a-112c through second feed lines 130a-130c and effluent fuel is removed from sorbent beds 112a-112c through output lines 140a-140c.

The regeneration system of the present invention purifies fluids and athermally regenerates sorbent beds. For example, the regeneration system can be used to absorb impurities such as sulfur from a raw feed fuel. The regeneration system can be used in any process where it is desired to remove impurities from a fluid. One or more sorbent beds are used to adsorb one or more classes of impurities from a fluid. When a sorbent bed approaches capacity, or its breakthrough point, a fluid stream containing a low level of the impurity is used in conjunction with electromagnetic radiation to desorb the impurities from the sorbent bed and carry them away in the fluid stream. With the impurities removed from the sorbent bed, the sorbent bed is regenerated and ready for reuse. Microwave radiation is particularly effective in removing the impurities from the sorbent bed when the fluid to be purified, the fluid used to carry away the impurities, and the sorbents have a relatively weak interaction with the frequency of radiation used compared to the impurity-sorbent adduct. In addition, the use of microwave energy allows the regeneration system to safely be used on-board a vehicle.

Although the present invention has been described with reference to preferred embodiments, workers skilled in the art will recognize that changes may be made in form and detail without departing from the spirit and scope of the invention.

The invention claimed is:

1. An athermal sorbent bed regeneration system, the system comprising:
   at least one athermal sorbent bed having an inlet for receiving a fuel having a first concentration of an impurity, the sorbent bed having a sorbent for adsorbing the impurity from the fuel to produce a purified fuel having a second concentration of the impurity, wherein the sorbent bed is configured to be athermally regenerated; and
   a microwave energy source for athermally regenerating the sorbent bed.

2. The system of claim 1, wherein the microwave energy source emits electro-magnetic energy sufficient to disrupt adsorptive forces between the sorbent and the impurity.

3. The system of claim 1, and further comprising:
   a fuel cell; and
   a flow path directing a first portion of the purified fuel to the sorbent bed and directing a second portion of the purified fuel to the fuel cell to generate electrical energy.

4. The system of claim 3, and further comprising a fuel processor, wherein the flow path directs the second portion of the purified fuel to the fuel processor before it is used to generate electrical energy in the fuel cell.

5. The system of claim 3, wherein the first portion of the purified fuel is a fluid that desorbs the impurity from the sorbent bed.

6. The system of claim 3, wherein the second concentration of the impurity is less than 15 parts per million by weight of the impurity.

7. The system of claim 1, wherein the sorbent is a sulfur-adsorbing sorbent material.

8. A system for regenerating an impurity-adsorbing sorbent bed, the system comprising:
   at least one athermal sorbent bed for adsorbing compounds containing an impurity, the sorbent bed configured to be athermally regenerated and receiving a purified fluid having about 100 parts per million or less by weight of the impurity for desorbing the impurity from the sorbent bed; and
   a microwave energy source for athermally regenerating the sorbent bed.

9. The system of claim 8, wherein the microwave energy source emits electro-magnetic energy sufficient to disrupt adsorptive forces between the sorbent bed and the impurity.

10. The system of claim 8, wherein the system is located on-board a vehicle.

11. The system of claim 8, wherein the sorbent bed adsorbs compounds containing the impurity from a fluid to produce the purified fluid.

12. The system of claim 11, wherein the concentration of the impurity in the purified fluid is less than 15 parts per million by weight of the impurity.

13. The system of claim 12, and further comprising a fuel cell; wherein the purified fluid with less than 15 parts per million is reacted in the fuel cell to produce electrical energy.

14. An athermal sorbent bed regeneration system, the system comprising:
   a first athermal sorbent bed having an inlet, an outlet and first sorbent for absorbing an impurity;
   a second athermal sorbent bed having an inlet, an outlet and a second sorbent for absorbing the impurity, the second sorbent bed connected to the outlet of the first sorbent bed; and
   a microwave energy source for athermally regenerating the first sorbent bed and the second sorbent bed.

15. The system of claim 14, and further comprising a fuel processor connected to the outlet of the first sorbent bed.

16. The system of claim 14, wherein the first sorbent is a sulfur adsorbing sorbent.

17. The system of claim 14, and further comprising a fuel that enters the first sorbent bed with a first concentration of the impurity and that exits the first sorbent bed and enters the second sorbent bed with a second concentration of the impurity, wherein the first concentration of the impurity is greater than the second concentration of the impurity, and wherein the fuel with the second concentration of the impurity is a fluid that desorbs the impurity from the second sorbent bed during a regeneration process.

* * * * *